United States Patent
Poley

(10) Patent No.: US 10,623,213 B2
(45) Date of Patent: *Apr. 14, 2020

(54) METHOD OF DETERMINING A DIRECTION OF ROTATION AND VALID TRANSITIONS OF QUADRATURE PULSES

(71) Applicant: TEXAS INSTRUMENTS INCORPORATED, Dallas, TX (US)

(72) Inventor: Richard Mark Poley, Sugar Land, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/433,907

(22) Filed: Jun. 6, 2019

(65) Prior Publication Data
US 2019/0288885 A1   Sep. 19, 2019

Related U.S. Application Data

(63) Continuation of application No. 15/223,537, filed on Jul. 29, 2016, now Pat. No. 10,320,594.

(Continued)

(51) Int. Cl.
   *G06F 11/30*   (2006.01)
   *H04L 25/49*   (2006.01)
   (Continued)

(52) U.S. Cl.
   CPC ....... *H04L 25/4902* (2013.01); *G01D 5/2451* (2013.01); *G01D 5/363* (2013.01); *H04L 27/38* (2013.01)

(58) Field of Classification Search
   CPC .................................................. H04L 25/4902
   See application file for complete search history.

(56) References Cited

U.S. PATENT DOCUMENTS

| 5,062,064 A * | 10/1991 | Sagues | G01P 3/489 |
| | | | 318/603 |
| 6,380,927 B1 * | 4/2002 | Ostrum | G06F 3/0312 |
| | | | 345/165 |
| 10,320,594 B2 * | 6/2019 | Poley | H04L 25/4902 |

* cited by examiner

*Primary Examiner* — Phuong Huynh
(74) *Attorney, Agent, or Firm* — Brian D. Graham; Charles A. Brill; Frank D. Cimino

(57) ABSTRACT

A method of determining a direction of rotation of a shaft is disclosed, as well as an integrated circuit chip that uses the disclosed method. The method includes receiving a first binary signal and a second binary signal from a transducer attached to the shaft, with the first and second binary signals being in quadrature. A present quadrant identification number, $QID_{PRESENT}$, is determined as a two-digit binary number by left-shifting a value of the first signal and adding a value of the second signal. After a sampling interval has elapsed, the method sets a past quadrant identification number, $QID_{PAST}$, to the value of said $QID_{PRESENT}$, determines a new value of $QID_{PRESENT}$ and calculates a value of a transition code using an equation that operates on $QID_{PRESENT}$ and $QID_{PAST}$. The method uses the transition code to determine a direction of rotation of the shaft.

19 Claims, 5 Drawing Sheets

Related U.S. Application Data

(60) Provisional application No. 62/364,475, filed on Jul. 20, 2016.

(51) Int. Cl.
*G01D 5/245* (2006.01)
*G01D 5/36* (2006.01)
*H04L 27/38* (2006.01)

METHOD OF DETERMINING A DIRECTION OF ROTATION AND VALID TRANSITIONS OF QUADRATURE PULSES

CROSS-REFERENCE TO RELATED APPLICATIONS

This application is a continuation of and claims priority to U.S. patent application Ser. No. 15/223,537 filed on Jul. 29, 2016, which claims priority to U.S. Provisional Patent Application No. 62/364,475 filed on Jul. 20, 2016, all of which are incorporated herein by reference.

FIELD OF THE DISCLOSURE

Disclosed embodiments relate generally to the field of tracking rotational motion, e.g., in motors. More particularly, and not by way of any limitation, the present disclosure is directed to a method of determining a direction of rotation and valid transitions of quadrature pulses.

BACKGROUND

Two basic types of encoders or transducers are used to convert angular motion of a shaft or axle into a signal: quadrature encoders and sinusoidal encoders. These encoders use two sensors placed ninety electrical degrees apart to provide two quadrature signals A and B and an optional third sensor that provides an output reference once every turn. Directional information is encoded in the phase relationship between the signal pair; with input A either leading or lagging input B by 90 degrees. There are typically a few thousand electrical cycles for each rotation of the shaft.

A quadrature encoder delivers a pair of digital signals (A and B, which can be a logical 1 or 0) that change state with input position. Relative position measurements are obtained by counting the number of edges; the accumulated count being incremented or decremented according to direction of movement. Sinusoidal encoders provide two analog signals that offer much higher position and speed resolution. The hardware or software techniques used to interface to the encoders can have a measurable impact on the achieved position resolution and accuracy. A quadrature phase relationship is always maintained between signals A and B, so simultaneous change of both inputs is an illegal condition and generally indicates an issue with the encoder or wiring.

A decoding device must be capable of detecting both the phase relationship between A and B, which identifies the direction of motion, and illegal edge transitions. Hardware implementations to identify these relationships can be quite efficient; software implementations are often slow. Improvements are needed.

SUMMARY

Disclosed embodiments assign a quadrant identity number ("QID") to each of the four possible input conditions. This number is formed by left-shifting the logical value of a first one of the signals by one position and adding the logical value of the second signal to yield a two-bit binary number in the range zero to three. A method computes a transition code using the present QID and the most recent previous QID. This transition code can quickly identify the direction of movement and may also indicate illegal transitions.

In one aspect, an embodiment of a method of determining a direction of rotation of a shaft is disclosed. The method includes receiving a first binary signal and a second binary signal from a transducer attached to the shaft, said first and second binary signals being in quadrature; determining a present quadrant identification number, $QID_{PRESENT}$, as a two-digit binary number by left-shifting a value of said first signal and adding a value of said second signal; after a sampling interval has elapsed, setting a past quadrant identification number, $QID_{PAST}$, to the value of said $QID_{PRESENT}$, determining a new value of $QID_{PRESENT}$ and calculating a value of a transition code using an equation that operates on $QID_{PRESENT}$ and $QID_{PAST}$; and using said transition code to determine a direction of rotation of the shaft.

In another aspect, an embodiment of a non-transitory computer-readable medium having a sequence of program instructions that, when executed by a processor, perform a method of determining a direction of rotation of a shaft is disclosed. The method includes receiving a first binary signal and a second binary signal from a transducer attached to the shaft, said first and second binary signals being in quadrature; determining a present quadrant identification number, $QID_{PRESENT}$, as a two-digit binary number by left-shifting a value of said first signal and adding a value of said second signal; after a sampling interval has elapsed, setting a past quadrant identification number, $QID_{PAST}$, to the value of said $QID_{PRESENT}$, determining a new value of $QID_{PRESENT}$ and calculating a value of a transition code using an equation that operates on $QID_{PRESENT}$ and $QID_{PAST}$; and using said transition code to determine a direction of rotation of the shaft.

In yet another aspect, an embodiment of an integrated circuit is disclosed. The integrated circuit includes a pulse width modulation (PWM) driver operable to provide PWM signals for controlling a motor; connections operable to receive a first binary signal and a second binary signal from a transducer attached to a shaft of the motor; and a feed-back loop connected between said connections and said PWM driver, said feed-back loop comprising a sequence of program instructions which, when executed by a processor, perform a method of determining a direction of rotation of a shaft, the method comprising: determining a present quadrant identification number, $QID_{PRESENT}$, as a two-digit binary number by left-shifting a value of said first signal and adding a value of said second signal, after a sampling interval has elapsed, setting a past quadrant identification number, $QID_{PAST}$, to the value of said $QID_{PRESENT}$, determining a new value of $QID_{PRESENT}$ and calculating a value of a transition code using an equation that operates on $QID_{PRESENT}$ and $QID_{PAST}$, and responsive to determining that said transition code is valid, using said transition code to determine a direction of rotation of the shaft.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 4A:
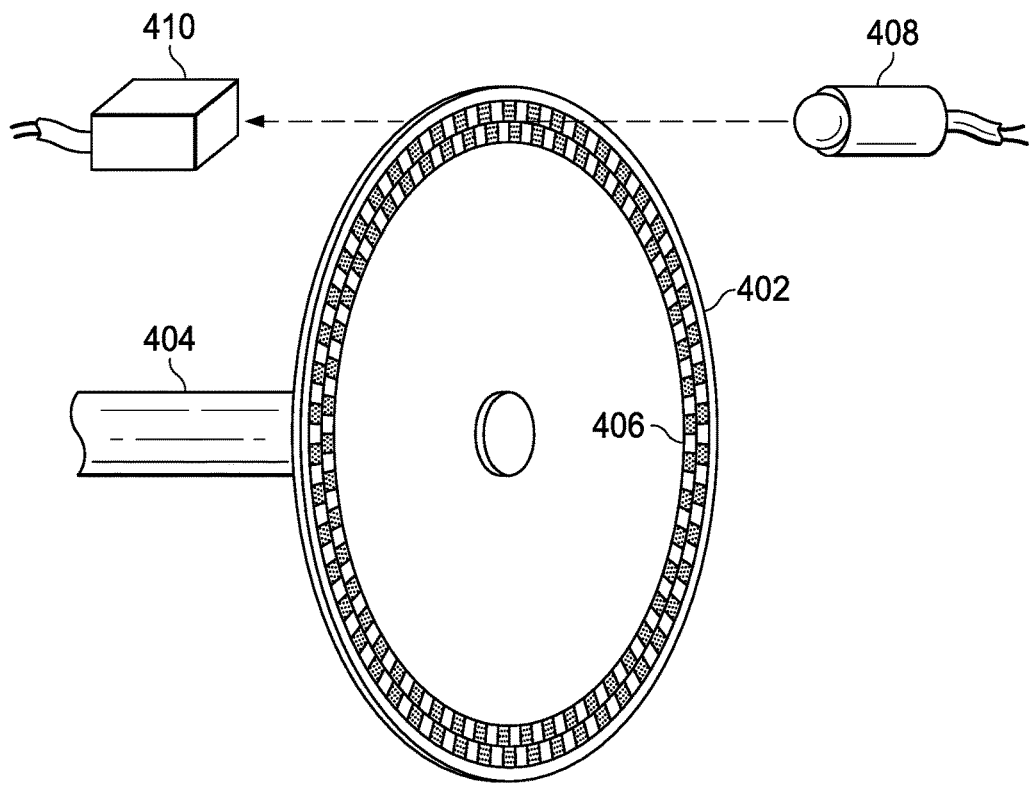
FIG. 4A depicts a sensor arrangement for a traditional quadrature encoder.
Figure 4B:
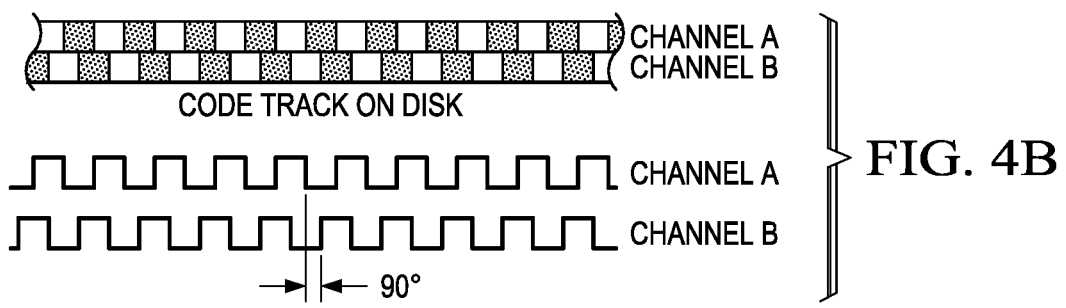
FIG. 4B depicts the alignment of the code track of the quadrature encoder of FIG. 4A and the waveform associated with the rotation of the device.

Turning first to FIG. 4A, a sensor arrangement for a traditional quadrature encoder is shown. In this example, rotating disk 402 is attached to shaft 404 of a device whose rotational speed and direction are to be tracked and/or controlled. Code track 406 runs around a periphery of rotating disk 402 and is configured to alternately block and allow the passage of light through the disk. When light source 408 is aimed at light sensor 410 behind rotating disk 402, rotation of the disk produces a square wave that tracks the rotation. FIG. 4B gives a closer view of the two code tracks carried on rotating disk 402, which are designated Channel A and Channel B, and of the signals generated by Channels A and B. It can be seen that the patterns of these two code tracks are offset from each other by one quarter of a cycle and produce signals that are in quadrature.

Figure 5A:
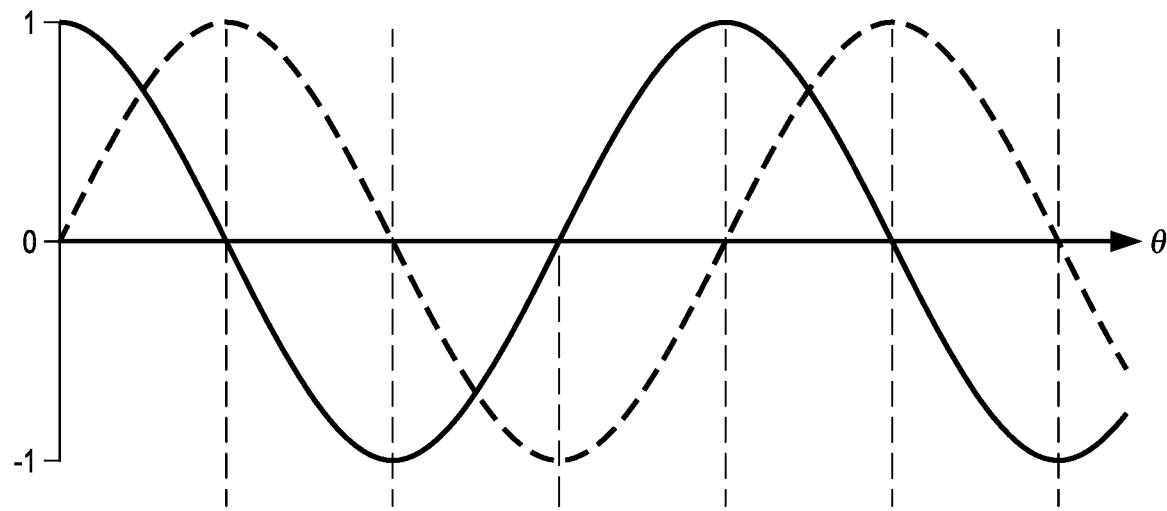
FIGS. 5A and 5B depict respectively the waveforms produced by a sinusoidal encoder and the square waves derived from the sinusoidal waveforms.

Sinusoidal encoders, also known as sincos transducers, are another method of sensing rotation; their advantage is that with some computation, it is possible to detect the precise angle of the shaft being sensed. The angle calculation comprises a "coarse" part found by counting quadrature edges, and a "fine" part found using an arctan calculation on the sinusoids. FIG. 5A depicts two signals produced by a sinusoidal encoder. The signals are produced by magnetic sensors that continually sense the strength of a magnetic field associated with a rotating shaft as seen from two different sensors. In order to determine a direction of movement of speed, these analog signals are converted into the square waveforms seen in FIG. 5B, which are essentially the same signals as produced by the earlier code tracks. Accordingly, it will be understood that although the methodology described in the present application was designed for a sinusoidal encoder, the method can also be used with a quadrature encoder.

Figure 6:
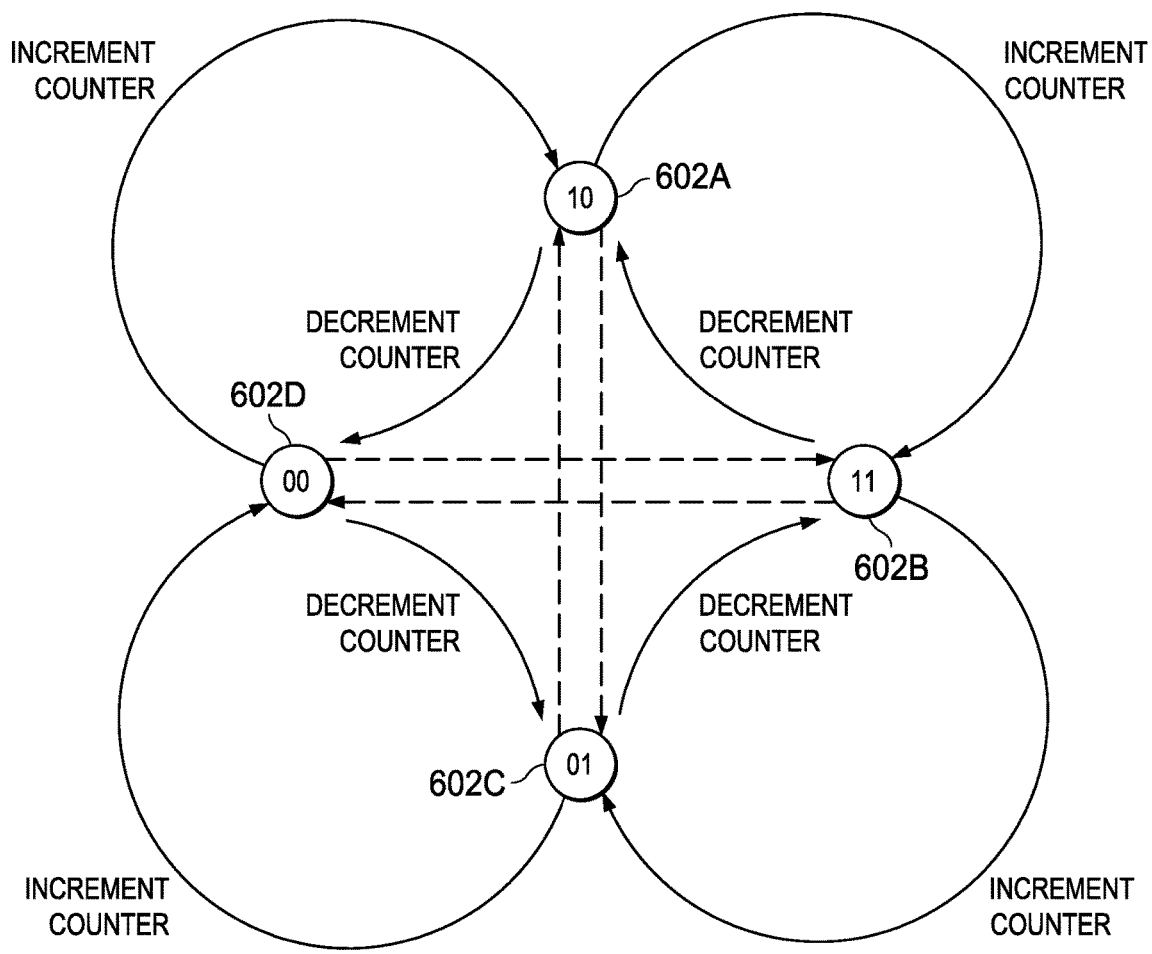
FIG. 6 depicts a state machine used to decode a square wave provided from a rotational transducer according to the prior art.
Figure 5B:
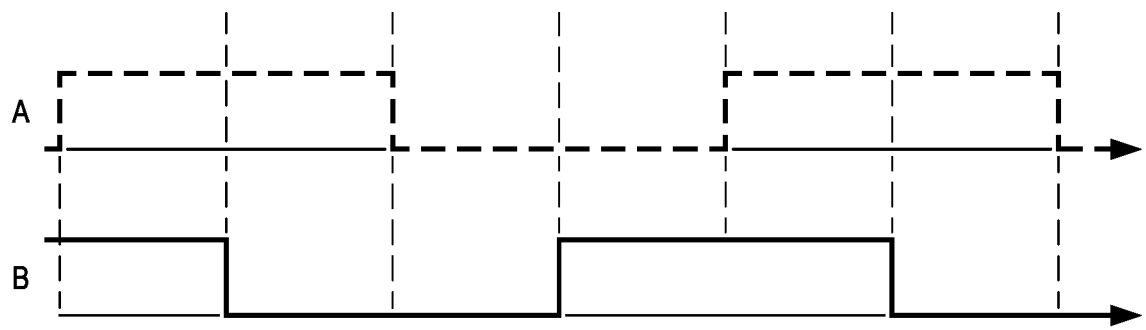

FIG. 6 illustrates a state machine according to the prior art, which has been used to decode the quadrature signals shown in FIG. 5B and determine a direction the shaft is moving. Four positions 602A, 602B, 602C, 602D are shown in this diagram carrying respective designations of 10, 11, 01, 00 to indicate the values of both signal A and signal B. In this instance, the leftmost digit in the pair is the value of signal A while the rightmost digit is the value of signal B. It will be understood that from position 602A, which designates a value 10, clockwise movement of the shaft (which causes the counter to increment) would mean that the next value is 11 and counter clockwise movement of the shaft (which causes the counter to decrement) would mean that the next value is 00. Because these signals are always in quadrature phase, a transition of 10 to 01 would be an invalid value and would indicate a fault in the received signals. The state machine of FIG. 6 can be implemented in either hardware or software. When implemented in hardware, this state machine can be quite efficient in quickly determining the direction of movement. However, when an appropriate hardware state machine is not available or practical, software implementations of this concept have not achieved timely results.

Applicant has determined that rather than implementing a state machine in software, either of two simple calculations can provide the information in a timely manner. Applicant notes that the disclosed method is designed to be used whether or not the shaft whose rotation is being measured is powered or not. To ensure that all transitions are captured, the incoming signal should be sampled at least as often as the incoming signals can possibly have transitions or edges. If this is done, the method will capture all counts. The disclosed method requires that each time a sampling period has elapsed, a transition code is determined using current values of the signals. The current transition code and the immediate past transition code are then used in a simple mathematical formula that can determine the direction of travel, as well as invalid transitions, as will be explained below. In one embodiment, a transition code of zero indicates that no transition has occurred, i.e., that the shaft is either not turning or the shaft is turning slowly enough that a transition does not always occur during the sampling period.

Figure 1:
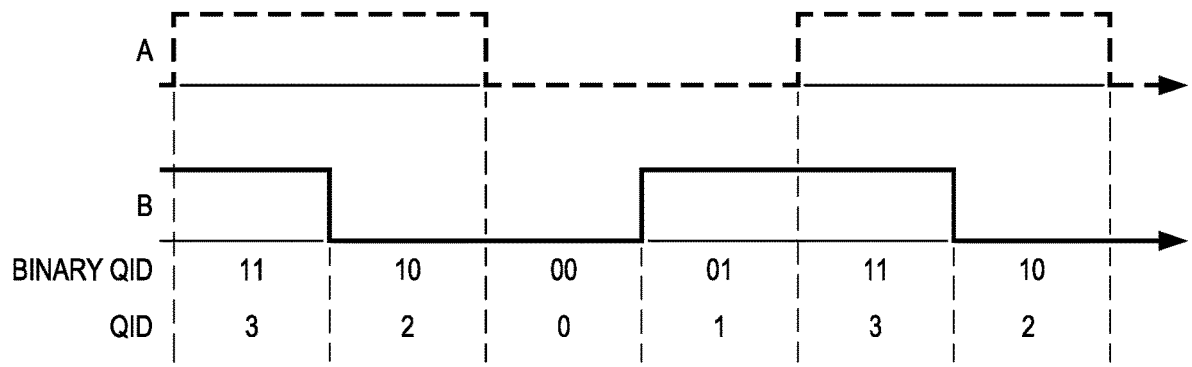
FIG. 1 depicts an example of quadrature signals from a transducer and an assignment of quadrants to those signals according to an embodiment of the disclosure.

Turning next to FIG. 1, this figure depicts an example of quadrature signals A and B from a transducer and the assignment of quadrant identification numbers (QIDs) to each possible value of those signals. A two-digit binary QID number can be formed using the value of signal A for a leftmost digit and the value of signal B for the rightmost digit, or in other words, by left-shifting the value of signal A and adding the value of signal B. The decimal version of the QID is also shown. When both signals are high, the binary value is 11 and the decimal value is 3. Similarly, the binary values of 10, 00, and 01 become decimal values of 2, 0 and 1 respectively; the sequence then begins to repeat as the rotation continues.

The disclosed method uses the current QID ($QID_{PRESENT}$), the immediate past QID ($QID_{PAST}$), and a simple equation to determine the direction of rotation and can also identify invalid transitions. Applicants have found two simple equations that can provide the desired information, with each having their own advantages. In a first embodiment, a transition code is determined using Equation 1:

$$TCODE1 = 2*QID_{PRESENT} - QID_{PAST} \quad \text{Equation 1}$$

Table 1 illustrates the valid TCODEs that can be produced using Equation 1. From this table, it can be seen that when the associated shaft is rotating in a clockwise manner, the values of TCODE1 proceed in the sequence 5, 1, −2, 2, 5, 1, −2, 2, etc. Similarly, if the associated shaft is rotating in a counter clockwise manner, the values of TCODE1 proceed in the sequence 4, 4, −1, −1, 4, 4, −1, −1, etc. Notably, the valid values in the clockwise direction do not overlap with the valid values in the counter clockwise direction, so the direction of rotation can be determined very quickly by noting the values of TCODE1.

TABLE 1

|  | QID | | | | | |
|---|---|---|---|---|---|---|
|  | 3 | 2 | 0 | 1 | 3 | 2 |
| Clockwise TCODE1 | 5 | 1 | −2 | 2 | 5 | 1 |
| Counter Clockwise TCODE1 | 4 | 4 | −1 | −1 | 4 | 4 |

As noted previously, the disclosed method is designed to be used whether or not the shaft is turning. Accordingly, it is possible to have $QID_{PRESENT} = QID_{PAST}$ when the shaft is not turning. When Equation 1 is being used, this can result in TCODE values of 3, 2, 0 and 1, depending on the QID when the rotation stopped. These values overlap both valid clockwise TCODE values and illegal codes, so it is not possible to determine from the TCODE whether a transition has occurred. Accordingly, this determination must be made prior to applying Equation 1. Table 2 illustrates all of the possible transition codes using Equation 1:

TABLE 2

| Transition code | CW | CCW | Illegal | No Edge |
|---|---|---|---|---|
| 6 |  |  | Yes |  |
| 5 | Yes |  |  |  |
| 4 |  | Yes |  |  |
| 3 |  |  | Yes | Yes |
| 2 | Yes |  |  | Yes |
| 1 | Yes |  |  | Yes |
| 0 |  |  | Yes | Yes |
| −1 |  | Yes |  |  |
| −2 | Yes |  |  |  |
| −3 |  |  | Yes |  |

In a second embodiment, a transition code is determined using Equation 2:

$$TCODE2 = (QID_{PRESENT})^2 - (QID_{PAST})^2 \quad \text{Equation 2}$$

Table 3 illustrates the valid TCODEs that can be produced using Equation 2:

TABLE 3

|  | QID | | | | | |
|---|---|---|---|---|---|---|
|  | 3 | 2 | 0 | 1 | 3 | 2 |
| Clockwise TCODE2 | 8 | −5 | −4 | 1 | 8 | −5 |
| Counter Clockwise TCODE2 | 5 | 4 | −1 | −8 | 5 | 4 |

It can be seen that if the associated shaft is rotating in a clockwise manner, the values of TCODE2 are produced in the sequence 8, −5, −4, 1, 8, −5, −4, 1, etc. Similarly, if the associated shaft is rotating in a counter clockwise manner, the values of TCODE2 are produced in the sequence 5, 4, −1, −8, 5, 4, −1, −8, etc. Using Equation 2, the valid values in the clockwise direction again do not overlap with the valid values in the counter clockwise direction, allowing the direction of rotation to be determined very quickly by noting the values of TCODE2. Additionally, however, if no transition has occurred because the shaft is not turning or is turning more slowly than the sampling interval, the resultant TCODE is always 0. As this is a unique code, overlapping with neither valid TCODES nor with invalid TCODES, calculating the TCODE using Equation 2 can identify when a transition has not occurred, so that there is no need to make this determination separately.

Table 4 illustrates all of the possible values that can be calculated using Equation 2 and clearly shows that each possible code uniquely identifies whether that value represents clockwise rotation, counter clockwise rotation, illegal values or a lack of an edge. Applicant notes that although Equation 2 is more computationally complex than Equation 1, most processors have hardware multipliers that make the difference in calculations negligible.

TABLE 4

| Transition code | CW | CCW | Illegal | No edge |
|---|---|---|---|---|
| 9 |  |  | Yes |  |
| 8 |  | Yes |  |  |
| 5 | Yes |  |  |  |
| 4 | Yes |  |  |  |
| 3 |  |  | Yes |  |
| 1 |  | Yes |  |  |
| 0 |  |  |  | Yes |
| −1 | Yes |  |  |  |
| −3 |  |  | Yes |  |
| −4 |  | Yes |  |  |
| −5 |  | Yes |  |  |
| −8 | Yes |  |  |  |
| −9 |  |  | Yes |  |

Figure 2:
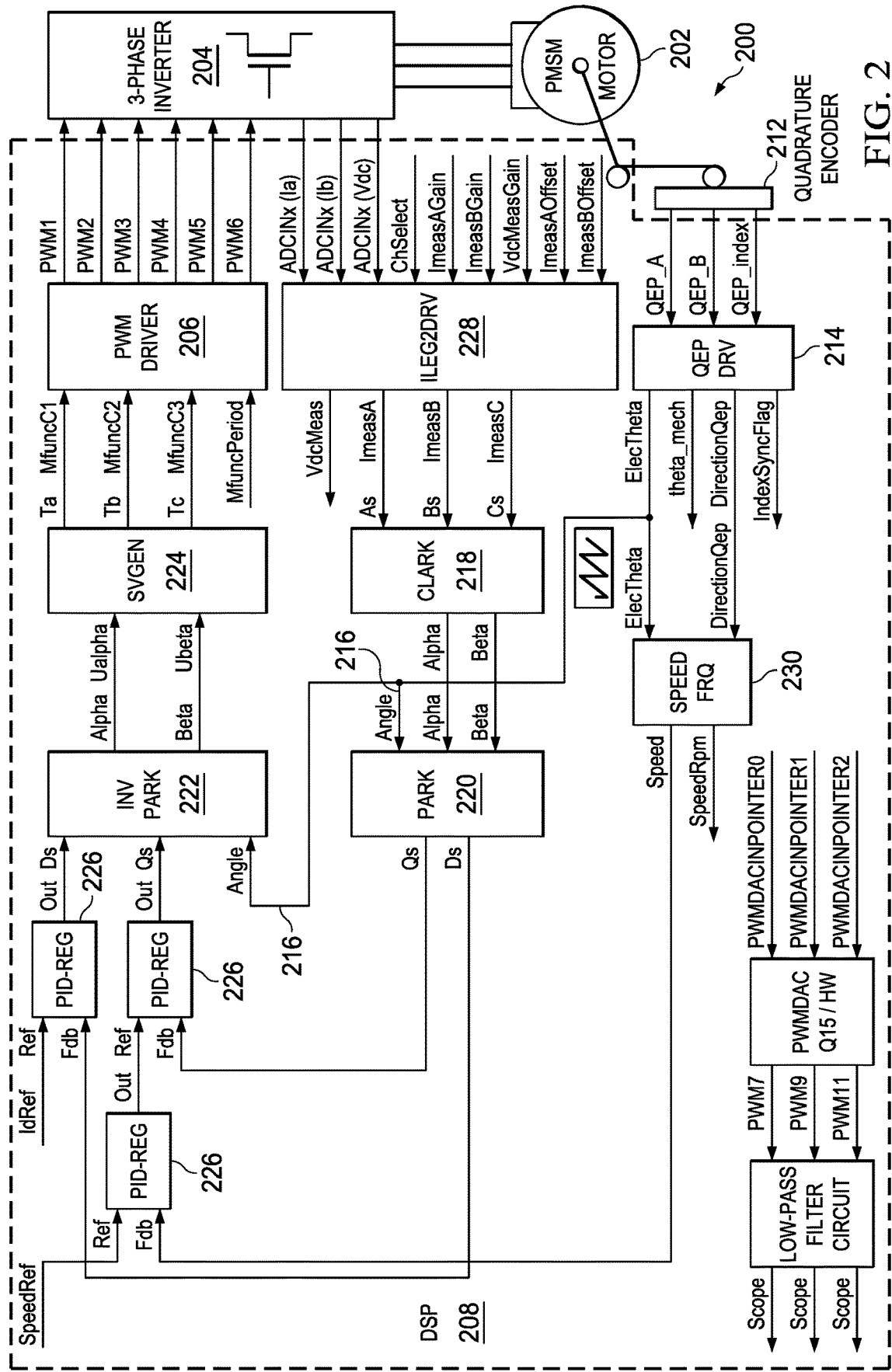
FIG. 2 depicts a system in which the disclosed method can be used according to an embodiment of the disclosure.

FIG. 2 is a block diagram of a motor control system in which the disclosed method can be used according to an embodiment of the disclosure. Motor control system 200 includes four main elements: motor 202, three-phase inverter 204, quadrature encoder 212 and digital signal processing (DSP) chip 208. Three-phase inverter 204 contains a number of high-power switches and provides power to motor 202, which may be, for example, a washing machine motor, A/C pump, etc. Three-phase inverter 204 is controlled by digital signal processor (DSP) 208. Quadrature encoder 212 is attached to the shaft of motor 202 to generate signals that can be used to determine rotor angle measurements. Outputs from the encoder include square wave signals QEP_A and QEP_B, which are interfaced directly to inputs of DSP 208.

DSP 208 includes a number of modules that act together to provide signals that will control motor 202 through three-way inverter 204. DSP 208 includes PWM driver 206, which generates switching waveforms PWM1-PVVM6 that drive the switches in three-phase power inverter 204. Three connectors (not specifically shown) receive the inputs from quadrature encoder 212, which in this embodiment include quadrature signals QEP_A, QEP_B and QEP_INDEX. The remainder of DSP 208 utilizes the signals received from quadrature encoder 212, signals $ADCIN_X(Ia)$, $ADCIN_X(Ib)$, and ADCINx(VDC) received -from three-phase inverter 204, and programmable inputs for gain and offset received at ILEG2DRV 228 to provide a feedback loop to PWM driver 206. This feedback loop includes quadrature encoder pulse driver (QEP DRV) 214, ILEG2DRV 228, speed and frequency module 230, Clark module 218, Park module 220, Inverse Park module 222, SVGEN module 224, PID-REG modules 226, as well as a number of modules not specifically discussed. QEP 214 receives signals QEP_A and QEP_B, determines the rotor position, and generates a direction of rotation signal from the shaft position encoder pulses. QEP DRV 214 provides four outputs: motor electrical angle (ELEC_THETA), motor mechanical angle (THETA_MECH), motor rotation direction (DIRECTION-QEP) and index synchronous status (INDEXSYNCFLAG). ELEC_THETA is used to provide rotor angle 216 to other modules within DSP 208.

Park transform module 220 and inverse Park transform module 222 convert vectors between a balanced two-phase orthogonal stationary frame and an orthogonal rotating reference frame. Clark transform module 218 converts balanced two phase quadrature quantities into balanced three phase quantities. Space vector with quadrature control (SV-GEN) 224 calculates the appropriate duty ratios needed to generate a given stator reference voltage using space vector PWM technique. The stator reference voltage is described by (a, b) components, $U_{ALPHA}$ and $U_{BETA}$. Proportional and Integral Regulators (PID-REG) 226 are software modules that implement two PI regulators with integral windup correction. Dual Inverter Leg Resistor Based Load Current Measurement Driver (ILEG2DRV) 228 is a driver module that converts two analog inputs into digital representations with programmable gains and offsets. The converted results represent load currents of a three-phase voltage source inverter for known conditions. DSP 208 uses obtained rotor angle 216 and the additional data that is derived from collected information to implement a control algorithm that controls motor 202. Further documentation on the system shown in FIG. 2 can be obtained in the document titled "PMSM3-1 System Documentation", found at ti.com, which is hereby incorporated by reference.

Figure 3A:
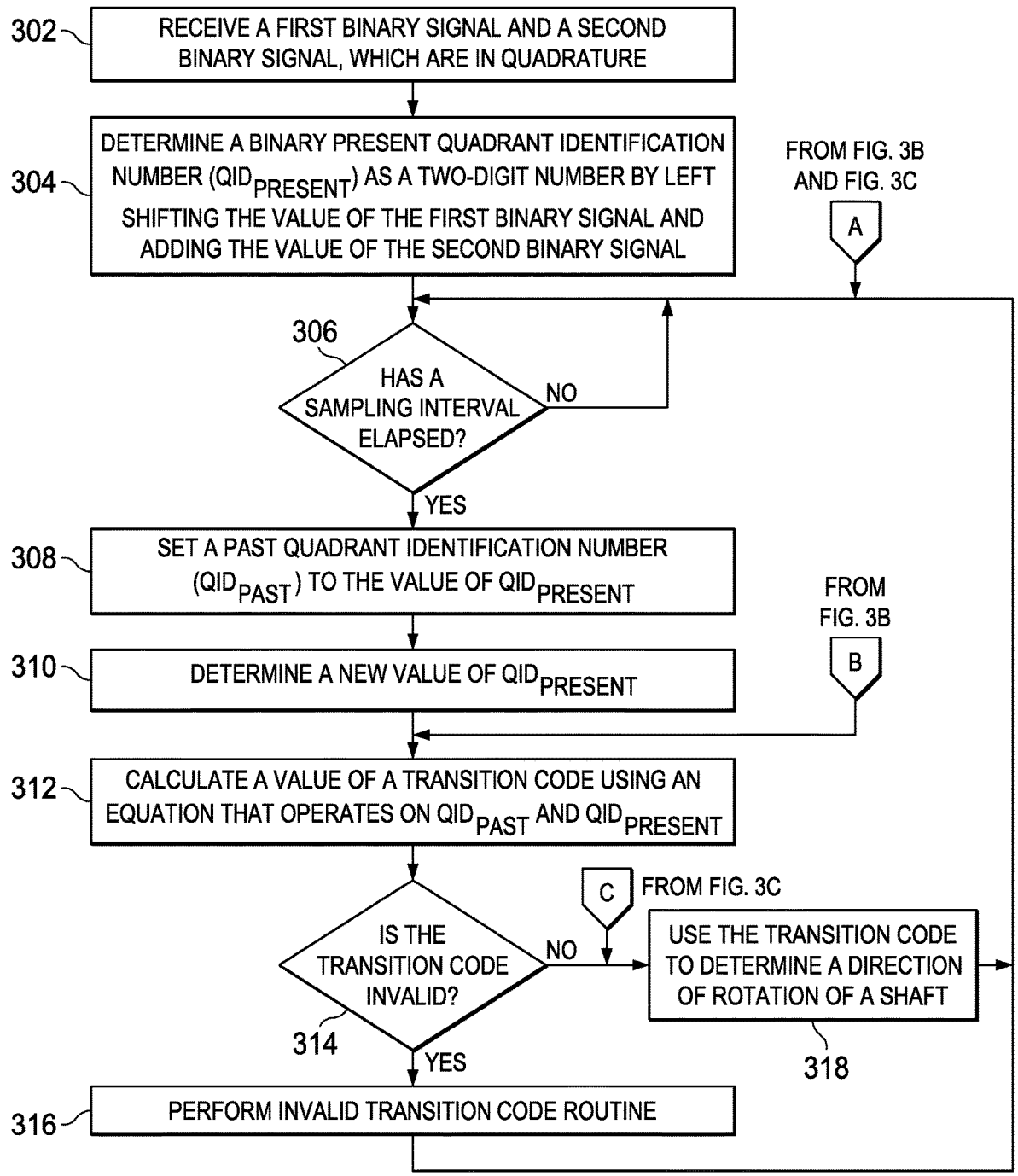
FIG. 3A depicts a flowchart of a method of determining a direction of rotation of a shaft according to an embodiment of the disclosure.

FIG. 3A discloses a method of determining a direction of rotation of a shaft. The method begins with a digital signal processor receiving 302 two binary signals that are in quadrature. In one embodiment, the two binary signals are produced by a quadrature encoder, such as quadrature encoder 214. In one embodiment, a sincos transducer produced analog quadrature signals, which were then converted into the received binary signals. The DSP determines 304 a present quadrant identification number, $QID_{PRESENT}$, as a two-digit number by left shifting the value of the first binary signal and adding the value of the second binary signal. The method determines 306 whether a sampling period has elapsed. As noted previously, a sampling period occurs at least as often as a transition may occur. If a sampling period has not elapsed, the method waits until the sampling period has elapsed. Once the sampling period has elapsed, the method continues by setting 308 a past quadrant identification number, $QID_{PAST}$ to the value of $QID_{PRESENT}$ and determines 310 a new value Of $QID_{PRESENT}$. A value is calculated 312 for a transition code using an equation that operates on $QID_{PRESENT}$ and $QID_{PAST}$. As noted previously, either Equation 1 or Equation 2 can be used for this calculation. The method then determines 314 whether the transition code that has been calculated is invalid. If the transition code is invalid, the method performs 316 an invalid transition code routine. The actual operation of the invalid transition code routine is outside the scope of this patent application and is not discussed herein. If the transition code is not invalid, the method uses 318 the transition code to determine a direction of rotation or a shaft. This information can then be used to track or control a motor, adjusting the operation of the motor as necessary.

Figure 3B:
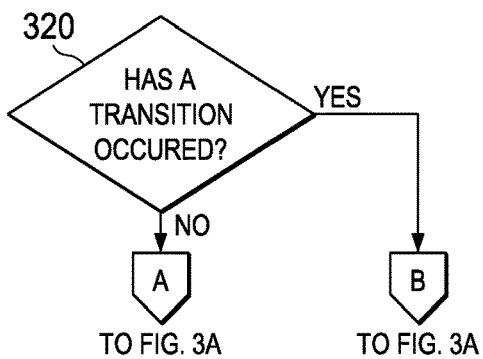
FIGS. 3B-3D depict additional elements of a method of determining a direction of rotation of a shaft according to one or more embodiments of the disclosure.

As part of determining a direction of rotation of the shaft, it is desirable to determine whether a transition has occurred. However, as mentioned previously, the transition code can be used to make this determination when Equation 2 is utilized, but not when Equation 1 is used. FIG. 3B makes this determination when Equation 1 is in use. In this embodiment, determining 320 whether a transition has occurred will take place after a new value of $QID_{PRESENT}$ is determined in element 310, but prior to calculating 312 the value of the transition code. If a transition has not occurred, the method returns to Entry point A to determine whether a new sampling interval has elapsed. If a transition has occurred, the method proceeds to Entry point B where a new value of the transition code is calculated.

Figure 3C:
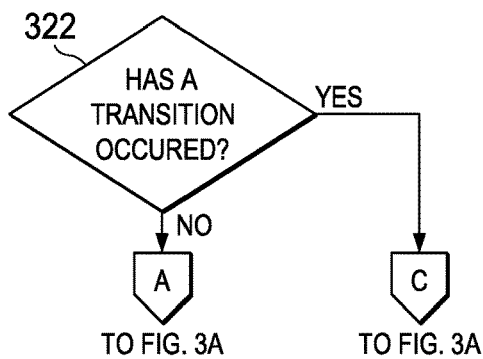
Figure 3D:
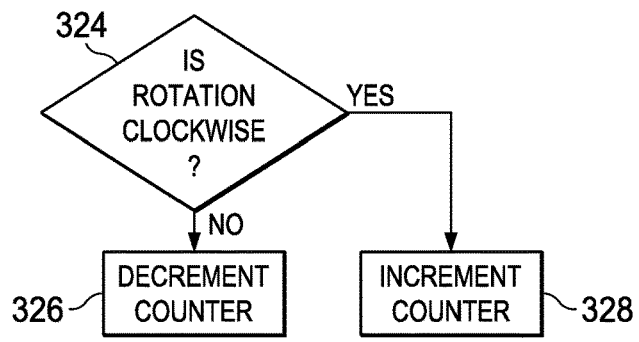

On the other hand, FIG. 3C depicts this determination when Equation 2 is being used. In this embodiment, the determination can be made after the transition code has been calculated and determined to be valid. If a transition has not occurred, the method again returns to Entry point A to determine whether a new sampling interval has elapsed. If a transition has occurred, the method proceeds to Entry point C where the transition code is used to determine the direction of rotation of the shaft. For embodiments using either of Equation 1 or Equation 2, FIG. 3D discloses further details of using the transition code to determine the direction of rotation. The method determines 324 whether the transition code identifies a clockwise rotation. Since, as has been discussed, the transition codes uniquely identify whether the shaft is turning in a clockwise or counter-clockwise direction, this can be quickly determined using the value of the transition code. If the rotation is not clockwise, a counter that counts transitions is decremented; if the rotation is clockwise, the counter is incremented.

Applicant has disclosed a method of determining a direction of rotation of a shaft with a simple computation that uses a present quadrant identification number and the past quadrant identification number to calculate a transition code. Use of the transition code also enables detection of an illegal transition in the received signals and in one embodiment also indicates when no transition has occurred in the signal. The direction of rotation can be used to increment or decrement a counter. The direction and speed of rotation, which are derived from the same signals, can then be used by a controller to control the speed and/or position of the shaft.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method comprising:
receiving first and second binary signals that are in quadrature with one another;
determining a present quadrant identification number ($QID_{PRESENT}$) based on the first binary signal and the second binary signal;
after a sampling interval has elapsed, setting a past quadrant identification number ($QID_{PAST}$) to the value of $QID_{PRESENT}$, determining a new value of $QID_{PRESENT}$; and, after determining the new value of $QID_{PRESENT}$, determining a transition code as a function of $QID_{PRESENT}$ and $QID_{PAST}$; and
in response to a determination that the transition code is valid, using the transition code to determine a rotation direction, producing a direction of rotation signal indicative of the rotation direction, generating at least one control signal based upon the direction of rotation signal, and using the at least one control signal to control a motor.

2. The method of claim 1, wherein $QID_{PRESENT}$ is a two-digit binary number, and wherein determining $QID_{PRESENT}$ based on the first binary signal and the second binary signal includes left-shifting a value of the first binary signal to obtain an intermediate value and then summing the intermediate value with a value of the second binary signal.

3. The method of claim 1, further comprising, in responsive to determining that the transition code is not valid, performing an invalid transition code routine.

4. The method of claim 1, wherein the determined rotation direction represents the rotation direction of a shaft operable to drive the motor.

5. The method of claim 1, wherein the function of $QID_{PRESENT}$ and $QID_{PAST}$ for determining the transition code is: $(2*QID_{PRESENT})-QID_{PAST}$.

6. The method of claim 5, further comprising, after determining the new value of $QID_{PRESENT}$ but before determining the value of the transition code as a function of $QID_{PRESENT}$ and $QID_{PAST}$, determining whether a transition has occurred.

7. The method of claim 6, further comprising:
responsive to determining that no transition has occurred, waiting for a next sampling period to elapse; and
responsive to determining that a transition has occurred, calculating an updated value of the transition code using the function of $QID_{PRESENT}$ and $QID_{PAST}$.

8. The method of claim 1, wherein the function of $QID_{PRESENT}$ and $QID_{PAST}$ for determining the transition code is: $(QID_{PRESENT})^2 - (QID_{PAST})^2$.

9. The method of claim 8, further comprising:
responsive to determining that no transition has occurred, waiting for a next sampling period to elapse; and
responsive to determining that a transition has occurred, using the transition code to determine the rotation direction.

10. The method of claim 1, wherein the transition code is:
a value from a first set of values when the rotation direction is a first direction;
a value from a second set of values when the rotation direction is a second direction opposite the first direction, wherein each value in the first set of values differs from every value in the second set of values; and
a value from a third set of values when the transition code is determined to be invalid, wherein each value in the third set of values differs from every value in the first and second sets of values.

11. The method of claim 1, wherein the second binary signal is a transducer signal.

12. An electronic device comprising:
one or more inputs to receive first and second binary signals that are in quadrature with one another;
a processor coupled to the one or more inputs; and
a memory coupled to the processor to store instructions that, when executed by the processor, cause the processor to:
determine a present quadrant identification number ($QID_{PRESENT}$) based on the first binary signal and the second binary signal;
after a sampling interval has elapsed, set a past quadrant identification number ($QID_{PAST}$) to the value of $QID_{PRESENT}$, determine a new value of $QID_{PRESENT}$; and, after the determination of the new value of $QID_{PRESENT}$, determine a transition code as a function of $QID_{PRESENT}$ and $QID_{PAST}$; and
in response to a determination that the transition code is valid, use the transition code to determine a rotation direction, produce a direction of rotation signal indicative of the rotation direction, generate a motor control signal based upon the direction of rotation signal, and output the motor control signal.

13. The electronic device of claim 12, wherein $QID_{PRESENT}$ is a two-digit binary number, and wherein the determination of $QID_{PRESENT}$ based on the first binary signal and the second binary signal includes left-shifting a value of the first binary signal to obtain an intermediate value and then summing the intermediate value with a value of the second binary signal.

14. The electronic device of claim 12, wherein the function of $QID_{PRESENT}$ and $QID_{PAST}$ for determination of the transition code is:

$(2*QID_{PRESENT})-QID_{PAST}$.

15. The electronic device of claim 14, wherein the instructions, when executed by the processor, further cause the processor to, after the determination of the new value of $QID_{PRESENT}$ but before the determination of the value of the transition code as a function of $QID_{PRESENT}$ and $QID_{PAST}$, determine whether a transition has occurred.

16. The electronic device of claim 15, wherein the instructions, when executed by the processor, further cause the processor to:
responsive to determining that no transition has occurred, wait for a next sampling period to elapse; and
responsive to determining that a transition has occurred, calculate an updated value of the transition code using the function of $QID_{PRESENT}$ and $QID_{PAST}$.

17. The electronic device of claim 12, wherein the function of $QID_{PRESENT}$ and $QID_{PAST}$ for determination of the transition code is:

$(QID_{PRESENT})^2 - (QID_{PAST})^2$.

18. The electronic device of claim 17, wherein the instructions, when executed by the processor, further cause the processor to:
responsive to determining that no transition has occurred, wait for a next sampling period to elapse; and
responsive to determining that a transition has occurred, use the transition code to determine the rotation direction.

19. The electronic device of claim 12, wherein the electronic device is an integrated circuit.

* * * * *